(12) United States Patent
Nishimura et al.

(10) Patent No.: US 7,968,210 B2
(45) Date of Patent: Jun. 28, 2011

(54) ALUMINUM TYPE PLATED STEEL SHEET AND HEAT SHRINK BAND USING THE SAME

(75) Inventors: Kunio Nishimura, Fukuoka-ken (JP); Masayuki Abe, Fukuoka-ken (JP); Haruhiko Eguchi, Fukuoka-ken (JP); Yoshihisa Takada, Fukuoka-ken (JP)

(73) Assignee: Nippon Steel Corporation, Tokyo (JP)

( * ) Notice: Subject to any disclaimer, the term of this patent is extended or adjusted under 35 U.S.C. 154(b) by 974 days.

(21) Appl. No.: 11/815,834

(22) PCT Filed: Feb. 9, 2006

(86) PCT No.: PCT/JP2006/302270
§ 371 (c)(1),
(2), (4) Date: Aug. 8, 2007

(87) PCT Pub. No.: WO2006/085594
PCT Pub. Date: Aug. 17, 2006

(65) Prior Publication Data
US 2009/0011275 A1 Jan. 8, 2009

(30) Foreign Application Priority Data

Feb. 10, 2005 (JP) .................................. 2005-034357

(51) Int. Cl.
*B32B 15/18* (2006.01)
*B32B 15/20* (2006.01)

(52) U.S. Cl. ........................ 428/653; 428/939

(58) Field of Classification Search ............ None
See application file for complete search history.

(56) References Cited

U.S. PATENT DOCUMENTS
4,496,400 A * 1/1985 Irie et al. ............... 148/505
(Continued)

FOREIGN PATENT DOCUMENTS
JP 61-124558 6/1986
(Continued)

OTHER PUBLICATIONS

Office Action of associated Russian Patent Application No. 2007130724/(033469) with English-language translation thereof.
Decision on Grant issued to Russian Patent Application No. 2007130724 with English translation thereof.
Office Action of associated Chinese Patent Application No. 2006800043706 with English-language translation thereof.

*Primary Examiner* — John J Zimmerman
(74) *Attorney, Agent, or Firm* — Dorsey & Whitney LLP

(57) ABSTRACT

An exemplary embodiment of an aluminum type plated steel sheet which excels in discoloration resistance, and weldability, which does not decorate after re-heating and which can prevent increasing of strength, and a heat shrink band using the same are provided. For example, the heat shrink band can be made of an aluminum type plated steel sheet consisting of a steel sheet being composed of, e.g., not more than about 0.005 mass % of C; not more than about 0.005 mass % of N; not less than about 0.1 mass % and not more than about 0.5 mass % of Si; not more than about 0.1 mass % of P; not more than about 0.02 mass % of S; not less than about 1.05 mass % and not more than 2.0 mass % of Mn; not more than 1.0 mass % of sol Al; a residual amount of Fe and inevitable impurities, and an aluminum type plated layer mainly consisting of Al being deposited thereon. Such exemplary sheet can be prevented from a discoloration upon, e.g., being re-heated at a temperature of not less than about 500° C. to not more than about 700° C.

9 Claims, 1 Drawing Sheet

U.S. PATENT DOCUMENTS

| | | | | |
|---|---|---|---|---|
| 4,589,931 | A * | 5/1986 | Yasuda et al. | 148/503 |
| 4,666,794 | A * | 5/1987 | Nickola et al. | 428/653 |
| 5,356,493 | A * | 10/1994 | Tsuyama et al. | 148/320 |
| 6,129,992 | A | 10/2000 | Sakuma et al. | |
| 6,562,150 | B2 * | 5/2003 | Hiratani et al. | 148/306 |
| 2002/0139450 | A1 * | 10/2002 | Ono et al. | 148/330 |
| 2006/0134452 | A1 | 6/2006 | Suzaki et al. | |

FOREIGN PATENT DOCUMENTS

| | | |
|---|---|---|
| JP | 62-050454 | 3/1987 |
| JP | 5-271783 | 10/1993 |
| JP | 6-108153 | 4/1994 |
| JP | 09-195021 | 7/1997 |
| JP | 11-293397 | 10/1999 |
| JP | 2000-290759 | 10/2000 |
| JP | 2001-32038 | 2/2001 |
| JP | 2001-032039 | 2/2001 |
| JP | 2001-236904 | 8/2001 |
| JP | 2003-034844 | 2/2003 |
| JP | 2004-315883 * | 11/2004 |
| RU | 2186145 C2 | 7/2002 |
| RU | 2186871 C2 | 8/2002 |
| SU | 308087 A | 7/1971 |
| WO | WO 2004/092433 | 10/2004 |
| WO | WO 2004/104254 | 12/2004 |

* cited by examiner

ALUMINUM TYPE PLATED STEEL SHEET AND HEAT SHRINK BAND USING THE SAME

CROSS REFERENCE TO RELATED APPLICATION(S)

The present application is a national phase application of International Application PCT/JP2006/302270 filed on Feb. 9, 2006 and published as International Publication WO 2006/085594 on Aug. 17, 2006. This application claims priority from the International Application pursuant to 35 U.S.C. §365. The present application also claims priority from Japanese Patent Application No. 2005-034357 filed on Feb. 10, 2005 under 35 U.S.C. §119. The disclosures of these applications are incorporated herein in their entireties.

FIELD OF THE INVENTION

The present invention relates to an aluminum type plated steel sheet having excellent heating-discoloring resistance and weldability, and a heat shrink band which is capable of using the same.

BACKGROUND INFORMATION

In general, a CRT (cathode-ray tube) can be reinforced with a heat shrink band, e.g., in order to prevent an implosion thereof. This heat shrink band may be made of a belt-shaped steel sheet by bending it to the shape of a side face of the CRT, and then welding both ends with each other to form a frame. Moreover, a metal bracket can be attached to each of the four corners of the heat shrink band by welding. When fixing the heat shrink band to the circumference of the CRT, the heat shrink band can be thermally expanded by heating it at approximately 500 to 600° C., and then the heat shrink band is set to the circumference of CRT and simultaneously cooled quickly. As a result, the heat shrink band may shrink due to such quick cooling, so that deformation caused by air pressure is corrected by the tension of the heat shrink band generated at that time.

Furthermore, it may be problematic that the weight of a heat shrink band is likely to increase in order to provide sufficient tension to rectify the deformation of the CRT caused by air pressure.

For example, a heat shrink band for use in the CRT of 21 inches in diagonal length may weigh about 700 g or more. Moreover, some heat shrink bands can be subjected to about 0-T bending processing, depending on the shape of the heat shrink band, and hence such a heat shrink band would likely utilize a steel sheet which satisfies both strength and processability. Further, it may be problematic that this heat shrink band can develop rust due to a change of temperature and humidity in a room, after the heat shrink band is fixed to the CRT. There may be a possibility that this rust can have a negative influence on the electronic beam of the CRT in addition to a problem of external appearance. However, it is unlikely to apply oil onto the surface of the steel sheet for use in a heat shrink band, in view of its use. Thus, in the heat shrink band, an electric galvanized steel sheet, a melting galvanized steel sheet, a melting zinc-aluminum plated steel sheet, a melting aluminum plated steel sheet, etc. can be used in order to reduce or prevent a formation of such rust.

For example, a use of a zinc type plated steel sheet may be problematic because alloying of zinc occurs may cause a discoloration, in the procedures of heating and expanding the heat shrink band at a temperature of about 500 to 600° C. This discoloration, although only a problem of appearance, may decrease its commercial value significantly. On the other hand, with respect to an aluminum type plated steel sheet, although such steel sheet would likely not discolor upon being heated at a high temperature for a short time such as a high-frequency induction heating, if it is heated by gas at a high temperature such as about 550° C. for a relatively long time period, for example at about 650° C. for approximately 15 seconds or more, then it may become discolored.

Japanese Patent Publication No. 2-61544 describes a production method of a heat-resistant aluminum-surface-treated steel sheet which includes a generation of a fine AlN layer which can prevent counter diffusion of Fe and Al during heating after metal plating, thereby suppressing alloying.

Japanese Unexamined Patent Application, First Publication No. H9-195021 describes a melting aluminum-plated steel sheet which can have a component system, such as a steel component, consisting of a predetermined amount of O and each of Ti, Nb, V, B, etc., in a particular amount so as to maintain sol-N stably, and which is subjected to melting aluminum plating, thereby likely preventing discoloration due to alloying.

Japanese Unexamined Patent Application, First Publication 2003-34844 describes an aluminum-plated steel sheet suitable for processing at high temperature which can achieve high strength after being processed at high temperature, e.g., as a result of adding Ti, P, Ni, and Cu thereto.

Japanese Patent Publication 5-26864 describes a production method of a molten Al-plated steel sheet which excels in gloss retention of the plated layer at high temperature, e.g., a steel sheet having a plated layer which may not discolor even if the steel sheet is used at a high temperature of approximately 550° C., e.g., because a barrier layer made of AlN can be formed at the boundary between the plated layer and steel sheet upon being heated, by leaving free nitrogen after plating. However, since the Si content and Mn content may be small, if the Al content is about 0.02 or less, then deoxidization may become insufficient at the time of exchanging of a ladle during a continuous casting, etc.

Thus, exemplary embodiment of the present invention are described herein which address at least some of the issues associated with a conventional arrangements and/or method. For example, it is one of the exemplary objects of the present invention to provide an aluminum type plated steel sheet which excels in discoloration resistance, and weldability, which may not decorate after re-heating and which can prevent increasing strength, and a heat shrink band that can utilize the same.

SUMMARY OF EXEMPLARY EMBODIMENTS OF THE INVENTION

In order to attain such exemplary object, a first exemplary embodiment of the present invention can be provided which may include a melting aluminum type plated steel sheet that can comprise a steel sheet being composed of not more than about 0.005 mass % of C; not more than about 0.005 mass % of N; not less than about 0.1 mass % and not more than about 0.5 mass % of Si; not more than about 0.1 mass % of P; not more than about 0.02 mass % of S; not less than about 1.05 mass % and not more than about 1.3 mass % of Mn; not more than about 1.0 mass % of sol Al; a residual amount of Fe and inevitable impurities, and an aluminum type plated layer consisting of, e.g., Al being deposited thereon. A discoloration can be reduce or prevented upon being such exemplary structure re-heated at a temperature of not less than about 500° C. to not more than about 700° C. According to a second exemplary embodiment of the present invention, the melting aluminum type plated steel sheet can be provided, in which when the C is not more than about 0.003 mass %, the N is not more than about 0.004 mass %, the P is not less than about 0.05 mass % and not more than about 0.08 mass %, and the Mn is not less than about 1.05 mass % and not more than about 1.3 mass %, about 0.2 mass % proof stress PS may not be less than about 300 MPa and a tensile strength TS may not be less than about 400 MPa.

According to a third exemplary embodiment of the present invention, the melting aluminum type plated steel sheet can be provided which may include a steel sheet being composed of not more than about 0.2 mass % of C; not more than about 0.007 mass % of N; not less than about 0.1 mass % and not more than about 0.5 mass % of Si; not more than about 0.1 mass % of P; not more than about 0.02 mass % of S; not less than 1.05 mass % and not more than about 2.0 mass % of Mn; not less than about 0.01 and not more than about 0.08 mass % of Nb; not more than about 1.0 mass % of sol Al; a residual amount of Fe and inevitable impurities, and an aluminum type plated layer including Al being deposited thereon. The discoloration can be reduced of prevented upon the exemplary structure being re-heated at a temperature of not less than about 500° C. to not more than about 700° C. According to a fourth exemplary embodiment of the present invention, the melting aluminum type plated steel sheet may be provided, in which when the C is not less than about 0.05 mass % and more than about 0.2 mass %, the Si is not less than about 0.1 mass % and not more than about 0.3 mass %, the Mn is not less than about 1.05 mass % and not more than about 1.5 mass %, and the Nb is not less than about 0.03 mass % and not more than about 0.05 mass %, a yield point YP may not be less than about 400 MPa and a tensile strength TS may not be less than about 550 MPa.

In a fifth exemplary embodiment of the present invention, a melting aluminum type plated steel sheet can be provided which includes a steel sheet being composed of not more than about 0.005 mass % of C; not more than about 0.005 mass % of N; not less than about 0.1 mass % and not more than about 0.5 mass % of Si; not more than about 0.1 mass % of P; not more than about 0.02 mass % of S; not less than about 1.05 mass % and not more than about 1.3 mass % of Mn; not more than about 1.0 mass % of sol Al; a residual amount of Fe and inevitable impurities, and an aluminum type plated layer including Al being deposited thereon. The reduction in strength upon being heated at a temperature of not less than about 500° C. to not more than about 700° C. after being plated is not more than about 10% compared to a temperature before being heated and/or reheated. Further, in a sixth exemplary embodiment of the present invention, e.g., when the C is not more than about 0.003 mass %, the N is not more than about 0.004 mass %, the P is not less than about 0.05 mass % and not more than about 0.08 mass %, and the Mn is not less than about 1.05 mass % and not more than about 1.3 mass %, about 0.2 mass % proof stress PS may not be less than about 300 MPa and a tensile strength TS may not be less than about 400 MPa.

In a seventh exemplary embodiment of the present invention, the melting aluminum type plated steel sheet can include a steel sheet being composed of not more than about 0.2 mass % of C; not more than about 0.007 mass % of N; not less than about 0.1 mass % and not more than about 0.5 mass % of Si; not more than about 0.1 mass % of P; not more than about 0.02 mass % of S; not less than about 1.05 mass % and not more than about 2.0 mass % of Mn; not less than about 0.01 mass % and not more than about 0.08 mass % of Nb, not more than about 1.0 mass % of sol Al; a residual amount of Fe and inevitable impurities, and an aluminum type plated layer including Al being deposited thereon. The reduction in strength upon being heated at a temperature of not less than about 500° C. to not more than 700° C. after being plated may not be more than about 10 mass % compared to a temperature before being heated and/or re-heated. Moreover, in an eighth exemplary embodiment of the present invention, when the C is not less than about 0.05 mass % and not more than about 0.2 mass %, the Si is not less than about 0.1 mass % and not more than about 0.3 mass %, the Mn is not less than about 1.05 mass % and not more than about 1.5 mass %, and the Nb is not less than about 0.03 mass % and not more than about 0.05 mass %, a yield point YP may not be less than 400 MPa and a tensile strength TS may not be less than about 550 MPa.

In addition, according to a ninth exemplary embodiment of the present invention, a heat shrink band can be provided which may utilize a melting aluminum type plated steel sheet comprising a steel sheet being having, e.g., of not more than about 0.005 mass % of C; not more than about 0.005 mass % of N; not less than about 0.1 mass % and not more than about 0.5 mass % of Si; not more than about 0.1 mass % of P; not more than about 0.02 mass % of S; not less than about 1.05 mass % and not more than about 1.3 mass % of Mn; not more than about 1.0 mass % of sol Al; a residual amount of Fe and inevitable impurities, and an aluminum type plated layer comprising of Al being deposited thereon. In a tenth exemplary embodiment of the present invention, the melting aluminum type plated steel sheet can be one in which when the C is not more than about 0.003 mass %, the N is not more than about 0.004 mass %, the P is not less than about 0.05 mass % and not more than about 0.08 mass %, and the Mn is not less than about 1.05 mass % and not more than about 1.3 mass %, about 0.2 mass % proof stress PS may not be less than about 300 MPa and a tensile strength TS may not be less than about 400 MPa.

Further, in an eleventh exemplary embodiment of the present invention, a heat shrink band can be provided which may utilize a melting aluminum type plated steel sheet including, e.g., a steel sheet being composed of not more than about 0.2 mass % of C; not more than about 0.007 mass % of N; not less than about 0.1 mass % and not more than about 0.5 mass % of Si; not more than about 0.1 mass % of P; not more than about 0.02 mass % of S; not less than about 1.05 mass % and not more than about 2.0 mass % of Mn; not less than about 0.01 and not more than about 0.08 mass % of Nb; not more than about 1.0 mass % of sol Al; a residual amount of Fe and inevitable impurities, and an aluminum type plated layer including Al being deposited thereon. According to a twelfth exemplary embodiment of the present invention, when the C is not less than about 0.05 mass % and more than about 0.2 mass %, the Si is not less than about 0.1 mass % and not more than about 0.3 mass %, the Mn is not less than about 1.05 mass % and not more than about 1.5 mass %, and the Nb is not less than about 0.03 mass % and not more than about 0.05 mass %, a yield point YP may not be less than about 400 MPa and a tensile strength TS may not be less than about 550 MPa.

According to still another exemplary embodiment of the present invention, it is possible to provide a melting aluminum type plated steel sheet having excellent discoloration resistance and weldability suitable for forming a heat shrink band, which, e.g., does not discolor even after being re-heated, and which can prevent deterioration of strength.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figure showing illustrative embodiment(s), result(s) and/or feature(s) of the exemplary embodiment(s) of the present invention, in which.

DETAILED DESCRIPTION OF EXEMPLARY EMBODIMENTS OF INVENTION

Figure 1:
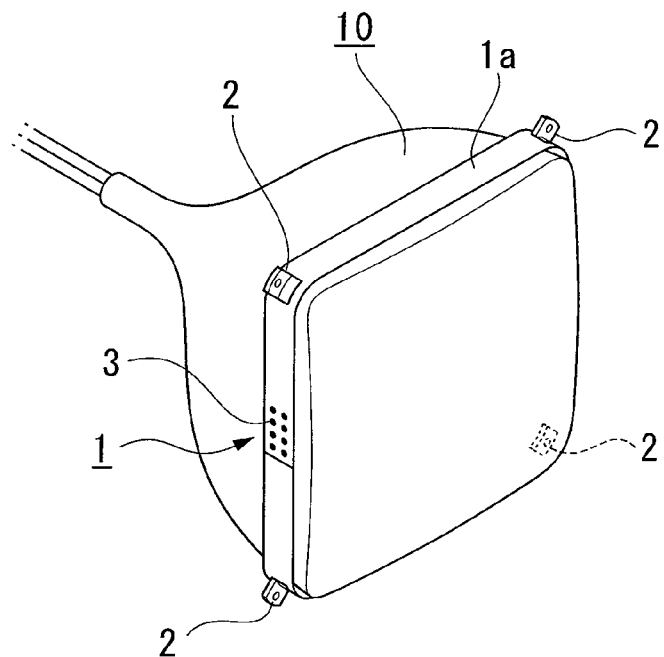
FIG. 1 is a perspective view showing an exemplary embodiment of a heat shrink band to which an exemplary embodiment of the present invention can be applied.

A further explanation regarding an exemplary embodiment of an aluminum type plated steel sheet to which an exemplary embodiment of the present invention can be applied and a heat shrink band which can use the aluminum type plated steel sheet is provided herein, with reference to the drawings. For example, % can indicates but not limited to mass %, unless otherwise noted.

A first exemplary embodiment of an aluminum type plated steel sheet according to the present invention can include a steel sheet being composed of not more than about 0.005 mass % of C; not more than about 0.005 mass % of N; not less than about 0.1 mass % and not more than about 0.5 mass % of Si; not more than about 0.1 mass % of P; not more than about 0.02 mass % of S; not less than about 1.05 mass % and not more than about 2.0 mass % of Mn; not more than about 1.0 mass % of sol Al; a residual amount of Fe and inevitable impurities, and an aluminum type plated layer mainly consisting of or including Al being deposited thereon.

For example, among each compositional element that may constitute this first exemplary embodiment of the aluminum type plated steel sheet, C contained in a steel component may be fixed by Ti, Nb, etc., e.g., in order to obtain an extreme-low carbon steel (IF: Interstitial Free). However, if the C content increases, then adding a large amount of Ti and Nb, which are also preferable for fixing C, can become important, thereby likely increasing costs. Moreover, an exemplary upper limit thereof can be determined as about 0.005% (which may include a range of tolerance) because C may have a negative influence on the magnetic property, such as magnetic permeability. On the other hand, in view of a relative ease in production, the C content can preferably be not more than about 0.003%.

Similarly to C, N contained in a steel component may be fixed by Ti, Nb, etc., e.g., in order to obtain a very-low carbon steel. However, if the N content increases, then addition of a large amount of Ti and Nb, which may also be preferable for fixing C, can become important, thereby likely increasing costs. Moreover, an exemplary upper limit thereof may be determined as about 0.005% (which can include a range of tolerance) because N likely has a negative influence on the magnetic property, such as magnetic permeability. On the other hand, in view of a relative ease of production, the N content can preferably be not more than about 0.003%.

Mn in a steel component can be an effective element for providing the discoloration resistance upon being re-heated, and strength at an ordinary temperature and upon being re-heated. Thus, e.g., at least about 1.05% (which can include a range of tolerance) of Mn may be added in order to secure strength. If the Mn content is not less than about 1.05%, then it is possible to prevent discoloration upon being re-heated and deterioration in strength of not less than about 10% upon being re-heated. On the other hand, if the Mn content exceeds about 2.0%, then variation in weldability and the mechanical property of welded portion can become large and a workability may deteriorate. Thus, an exemplary upper limit thereof can be determined as about 2.0% (which may include a range of tolerance). It should The Mn content can preferably be not more than about 1.3%, in view of a relative ease in production.

Although Si contained in a steel component is likely an effective element for securing discoloration resistance upon being re-heated, if the Si content increases, then wettability of plating may deteriorate to possibly cause non-plating. Thus, an exemplary upper limit thereof can be determined as about 0.5% (which can include a range of tolerance). As for Mn and Si contained in a steel component, if the content of each increases, then the same or similar effect as in AlN (aluminum nitride) which can suppress Al—Si alloying may be exhibited. On the other hand, the lower limit of the Si content can be determined as about 0.1%. Because, if the Si content may be less than this exemplary value, then the discoloration resistance may not be obtained. In addition, if the Si content is not less than about 0.1%, then the deterioration in strength of not less than about 10% upon being re-heated can be suppressed. Each of Mn and Si may exist near the surface of a steel sheet in an intercrystallized form in iron and in the form of oxide in a concentrated state during heating before plating and/or during plating. Each of Mn and Si may exist in a crystal grain and at crystal grain boundary.

If a large amount of Si or Mn is present, which may likely generate an oxide, is contained in the exemplary case of performing zinc plating, then an oxide film may be formed on the surface the steel plate before plating, thereby possibly deteriorating the plating performance. This can be because neither oxide of Mn or of Si which has been already generated can be easily reduced, since the affinity between Mn or Si and oxygen may be larger than the affinity between Zn and oxygen.

However, in the case of performing aluminum plating, since the affinity of aluminum with oxygen may be stronger than that of Si or Mn with oxygen, the oxide of Si or Mn can be reduced. Therefore, even if a large amount of Mn or Si is contained, the oxide which may be generated during heating before plating can be reduced without deteriorating plating performance, in addition, it may be present in the form of a concentrated solid solution of Mn or Si at the interface after plating. However, since the oxidative performance of Si may be stronger than that of Mn, if oxide is generated excessively, then oxide in an amount which can deteriorate the plating performance may be generated at the interface, and hence the upper limit thereof can be determined as described above.

Each of these concentrated Mn and Si which may exist at the interface can prevent Fe from diffusing from a steel sheet into plating during re-heating after plating. Thereby, the discoloration can be prevented during re-heating within the range of temperature and time demonstrated according to the exemplary embodiment of the present invention. However, if Mn or Si which can exist at the interface moves from the interface during this re-heating, then the effect of preventing diffusion of Fe may decrease, and as a result, the discoloration can be generated even within the range of time and temperature according to the exemplary embodiment of the present invention. In order to prevent each of Si and Mn from moving freely, it may be important that a sufficient amount of Mn or Si already exist in the grain boundary before re-heating, so that each of Si and Mn which is soluted within a crystal grain may not move to the grain boundary.

Moreover, if a large amount of Mn or Si, which can be a solution hardening type element, is contained in a steel sheet, then it is possible to suppress the deterioration of strength to be not more than about 10% when re-heating at high temperature. For example, if Mn or Si moves freely in steel during re-heating, then the strength may deteriorate. In order to prevent each of Si and Mn from moving freely, it may be important that a sufficient amount of Mn or Si already exist in the grain boundary, so that each of Si and Mn which is soluted within a crystal grain may not move to the grain boundary. For this exemplary reason, it may be preferable that the concentration of Mn and Si becomes higher, and thus an exemplary lower limit thereof exists.

Therefore, in order to prevent both the discoloration and deterioration in strength during re-heating, it may be important that a sufficient amount of Mn or Si already exist in the grain boundary, so that each of Si and Mn which may be soluted within a crystal grain may not move to the grain boundary. For this exemplary reason, each of an exemplary lower limit of the Mn content and an exemplary lower limit of the Si content, which can be used to prevent both the discoloration and deterioration in strength during re-heating, may be approximately the same quantity.

Regarding this exemplary lower limit, the Si content may not be less than about 0.1%, and the Mn content may not be less than about 1.05%, which are sufficient amounts for not affecting diffusion at the interface and deterioration of strength, even if solid soluted elements existing at the interface or the inside of steel move during re-heating.

Although P in the steel component can be an effective element in securing hardness, if the P content increases, then the toughness as well as weldability of the steel sheet may deteriorate, and thus the upper limit thereof can be determined to be 0.1% (including the range of tolerance).

On the other hand, the lower limit of the P content can preferably be about 0.01%. Because, if the P content is less than this value, then sufficient strength may likely not be obtained.

S contained in the steel component is an element which is likely contained inevitably as an impurity, and which generally causes cracking or scratches during hot-rolling. Moreover, since S deteriorates weldability or magnetic property, it may be important to be reduced as much as possible. However, such problem can be suppressed by making an exemplary upper limit thereof to be about 0.02% (including the range of tolerance).

A sol. (acid soluble) Al in the steel component can be added as a deoxidizer of molten steel, the upper limit of which may be determined as about 1.0% (including the range of tolerance). On the other hand, an exemplary lower limit of the sol.Al content can preferably be about 0.005%. Because, if the sol.Al content is less than this value, then a sufficient deoxidation effect may likely not be obtained.

The exemplary upper limit and/or the lower limit described herein may be defined with an average value derived from measured values, and the phrase "including the range of tolerance" can mean but not limited to that in the case in which analyzed values include accidental errors, a common difference may be added to or subtracted from the upper limit or the lower limit defined with the above average value, respectively, and the resultant value can be determined as the new upper limit or new lower limit.

In the case of an aluminum type metal plating, an Al—Fe alloy layer may grow to be thick at the plating interface, such that the grown alloy layer causes delamination during processing. For this reason, by adding Si in an amount of approximately not less than 6% and not more than about 12% by weight ratio into a hot dip aluminum coating bath which contains mainly Al, it is possible to provide discoloration resistance, while suppressing growth of the alloy layer, similarly to Si contained in the above described exemplary embodiment of the steel component.

The first exemplary embodiment of the aluminum type plated steel sheet having the above-described exemplary component would likely not cause a discoloration even if it is re-heated, for example, at a temperature of not less than about 500° C. and not more than about 700° C. for about 250 to 450 seconds. In addition, it is possible to suppress or reduce the deterioration in strength to be not more than 10% upon being re-heated at a temperature of not less than about 500° C. and not more than about 700° C. Moreover, in the case of heating the exemplary structure for a period, e.g., shorter than that in the above at a temperature of not less than about 500° C. and not more than about 700° C., the discoloration will likely not occur. However, if the structure is heated for not less than about 900 seconds, then the discoloration may occur. Moreover, in the first exemplary embodiment of the aluminum type plated sheet, it is possible to make, e.g., the 0.2% proof stress PS be not less than about 300 MPa and tension strength TS be not less than about 400 MPa, by making the component in the steel component contain not more than 0.03% of C, not more than 0.004% of N, not less than 0.05% and not more than about 0.08% of P, and not less than about 1.05% and not more than about 1.3% of Mn.

A second exemplary embodiment of the aluminum type plated steel sheet according to the present invention can be characterized by performing thereon an aluminum type plating which can consist of Al on a steel sheet having a composition consisting of not more than about 0.2% of C, not more than about 0.07% of N, not less than about 0.1% and not more than about 0.5% of Si, not more than about 0.1% of P, not more than about 0.02% of S, not less than about 1.05% and not more than about 2.0 of Mn, not less than about 0.01% and not more than about 0.08% of Nb, not more than about 1.0% of sol Al, and the remainder of Fe and inevitable impurities.

For example, in each element which constitutes the second exemplary embodiment of the aluminum type steel sheet, C contained in the steel component can be an element effective to ensure strength. However, if the C content is high, then processability and weldability may deteriorate, and hence the upper limit thereof can be determined as about 0.2% (including the range of tolerance).

N possibly contained in the exemplary steel component is an element which can be contained therein, and if the N content becomes high, then a large amount of Ti and Nb should be added, thereby possibly increasing costs. Moreover, N may have a negative influence on the magnetic performance such as magnetic permeability, and hence the upper limit thereof may be determined as about 0.007% (including the range of tolerance).

Mn in a steel component can be an effective element for providing the discoloration resistance upon being re-heated and strength at an ordinary temperature and after being re-heated, and at least about 1.05% (including the range of tolerance) or more of Mn may be added for securing strength. On the other hand, if Mn in excess of about 2.0% is added, then dispersion of the weldability or mechanical performance of a welded portion may increase to deteriorate the processability, and hence the upper limit thereof may be determined as about 2.0% (including the range of tolerance).

Si contained in the steel component can be an element effective for providing the discoloration resistance upon being re-heated. However, if the Si content increases, then the wettability of plating may deteriorate to cause non-plating, and hence the upper limit thereof can be determined as about 0.5% (including the range of tolerance). That is, if the Mn content or Si content of the steel component increases, then the same effect as in AlN (aluminum nitride) suppressing Al—Si alloying can be obtained. On the other hand, the lower limit of Si may be determined as about 0.1%. If the Si content is less than this value, then alloying can progress upon being re-heated to cause discoloration.

Although P in the steel component may be an effective element for providing hardness, if the Al content increases, then the toughness and weldability of the exemplary steel may deteriorate, and hence the upper limit thereof can be determined as about 0.1% (including the range of tolerance). On the other hand, the lower limit of P may preferably be about 0.01%. Because, if the P content can be less than this value, then sufficient strength may likely not be obtained.

S in the steel component may be an element contained as an impurity, which can cause cracks or scratches upon being hot-rolled. Moreover, S can deteriorate the weldability or magnetic performance, and hence it may be important to decrease S as much as possible. However, such problem can be suppressed or reduced by making the upper limit to be about 0.02% (including the range of tolerance).

Nb contained in the steel component can be an element which may form a carbo-nitride and contributes to improving hardness, and at least about 0.01% (including the range of tolerance) or more of Nb may be added in order to improve the strength. On the other hand, since the effect of the improvement in hardness may be saturated even if more than about 0.08% of Nb is added, the upper limit thereof may be determined as about 0.08% (including the range of tolerance).

Sol.Al contained in the steel component can be added as a deoxidizer of molten steel, and upper limit thereof may be determined as about 1.0% (including the range of tolerance). On the other hand, the lower limit of sol (solid solution) aluminum can preferably be about 0.005%. If the sol (solid solution) aluminum content is less than this value, then a sufficient deoxidation effect may likely not be obtained.

The exemplary upper limit or the exemplary lower limit discussed herein may be defined with an average value derived from measured values, and the phrase "including the range of tolerance" can mean but not limited to that in the case in which analyzed values include accidental errors, a common difference may be added to or subtracted from the upper limit or the lower limit defined with the above average value, respectively, and the resultant value can be determined as the new upper limit or new lower limit.

In the case of an exemplary embodiment of an aluminum type metal plating, an Al—Fe alloy layer may grow to be thick at the plating interface, such that the grown alloy layer can cause a delamination during processing. Thus, by adding Si in an amount of approximately not less than 6% and not more than about 12% by weight ratio into a hot dip aluminum coating bath which contains mainly Al, it is possible to provide discoloration resistance, while likely reducing or suppressing the growth of the alloy layer, similarly to Si contained in the above described exemplary embodiment of the steel component.

The second exemplary embodiment of the aluminum type plated steel sheet having the above-described exemplary component would likely not cause the discoloration even if it is re-heated, for example, at a temperature of not less than about 500° C. and not more than about 700° C. for about 250 to 450 seconds, in addition, it is possible to suppress the deterioration in strength to be not more than about 10% upon being re-heated at a temperature of not less than about 500° C. and not more than about 700° C. for about 10 to 30 seconds. However, if it is heated for not less than about 900 seconds, then the discoloration may occur. Moreover, in the second exemplary embodiment of the aluminum type plated sheet, it is possible to make the yield point YP be not less than about 400 MPa and tension strength TS be not less than about 550 MPa, by making the component in the steel component contain not less than about 0.05% and not more than about 0.2% of C, not less than about 0.1% and not more than about 0.3% of Si, not less than about 1.05% and not more than about 1.5% of Mn, and not less than about 0.03% and not more than about 0.05% of Nb.

The first and the second exemplary embodiments of the aluminum type plated sheets can be optimum for a heat shrink band 1 of a CRT (Cathode-Ray Tube) 10 as shown, for example, in FIG. 1. For example, the heat shrink band 1 may include a band main body 1a which can be engaged to the periphery of the CRT 10, and a bracket 2 which may be disposed to the band main body 1a. The band main body 1a can be shaped into a frame shape as a whole by bending that which is cut from the above-mentioned aluminum type plated steel sheet into a belt-like shape with a predetermined length and processing, corresponding to the panel side shape of the CRT 10, and welding both ends in the longitudinal direction at a welded part 3. On the other hand, the bracket 2 ca be, for example, a metallic member which is bent into an approximately "L" shape, in order to attach the CRT 10 to the cabinet of a television receiver, and the bracket 2 may be attached to each of the welded parts 3 at the diagonal position of the four corners of the band main body 1a with spot welding.

Figure 2:
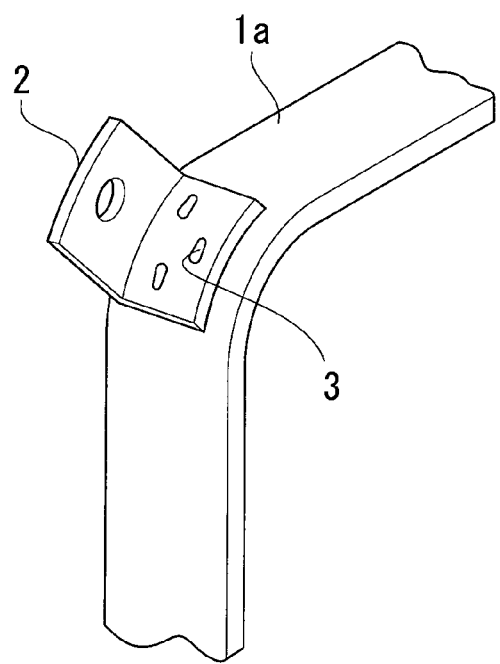
FIG. 2 is a perspective view of an enlarged attached portion of an exemplary embodiment of a bracket of the heat shrink band shown in FIG. 1.

The spot welding may be performed as shown in FIGS. 1 and 2, when processing the exemplary steel sheet into the shape of a heat shrink band. Thus, the steel sheet can merely be plated, and hence no change in the surface of plating such as discoloration may have yet occurred. Moreover, the thickness of the alloy layer which can exist in a plating bath and is likely to be related to weldability can be significantly influenced by the Si concentration during the plating process, regardless of components of the steel, as mentioned in the above, and the growth of the alloy layer can be suppressed in the case in which the Si content in the plating bath is within the range of not less than about 6% and not more than about 12%, and hence the influence of the plating layer on weldability may be very small, as long as the Si content is within this range. An element contained in the steel sheet such as C, S, and P would rather influence, in the case of a plated steel sheet which mainly consists of Al. These exemplary elements may accumulate at the melting interface or deteriorate the strength of the melting interface, when the surface of the steel sheet melts together with the plate layer at the time of performing spot welding. If $C \leq 0.2\%$ or $P \leq 0.1$ and $S \leq 0.02\%$ in the case of the exemplary plated steel sheet which consists mainly of Al, then there may not be a problem in the weldability.

Regarding the heat shrink band 1 having the exemplary structure described herein, the band main body 1a, which can be heated for example at a temperature of approximately not lower than about 500° C. and not higher than about 600° C. for about 10 to 30 seconds so as to be expanded, can be rapidly cooled at the same time it is engaged with the circumference of the CRT 10. Then, this exemplary band main body 1a may shrink to be thermally fitted to the circumference of the CRT 10. And the deformation due to air pressure of the CRT 10 may be rectified by the tension of the band main body 1a which may be generated at such time.

As described herein, this heat shrink band 1 can be constituted from the above-described exemplary embodiment of the aluminum type plated steel sheet which is capable of preventing deterioration in strength of the welded part 3 without causing the discoloration of the band main body 1a, e.g., even after being re-heated and which excels in discoloration resistance and weldability. Therefore, the heat shrink band 1 which can be made of the such exemplary aluminum type plated steel sheet can maintain gloss even after being reheated and excels in corrosion prevention. Furthermore, this heat exemplary shrink band 1 may have a lighter weight than the conventional one, excellent processability and sufficient strength, and hence it can stably attach the CRT 10 to the cabinet of television receiver.

Hereafter, although the effect of the exemplary embodiments of the present invention will be clarified with examples, the following examples do not restrict the technical scope of the present invention. First, as Examples and Comparative Examples of the first aluminum type plated steel sheet described herein, each steel sheet of which the steel components may differ from each other as shown in Table 1 was cast, re-heated, and thereafter hot-rolled, pickled, cold-rolled, and annealed to obtain each steel plate. Further, each steel sheet was subjected to a hot-dip plating using a hot-dip plating line of a Non Oxygen Furnace (NOF)-Reduction Furnace (RF) type (NOF sheet temperature $\geqq 600°$ C., RF sheet temperature $\geqq 800°$ C.), while changing the kind of aluminum plating bath (Si concentration ranges from 9% to 11%, plating bath temperature ranges from 640° C. to 670° C.). The dew point in the reduction furnace was adjusted to be within the range of 0° C. to −40° C. And a skin pass rolling was performed to produce each of samples 1 to 17 having a thickness of 1.7 mm finally. It should be noted that, in Table 1, CR in sample No. 3 indicates a cold-rolled sheet, GI in sample No. 4 indicates a hot dip galvanizing, and GL in sample No. 5 indicates Galbarium (aluminum 55%-Zn).

TABLE 1

| No | OBJECT | TYPE OF STEEL | STEEL COMPONENT (%) | | | | | | | | |
|---|---|---|---|---|---|---|---|---|---|---|---|
| | | | C | Si | Mn | S | P | N | Nb | Ti | sol. Al |
| 1 | EXAMPLE | AL PLATED | 0.003 | 0.3 | 1.2 | 0.01 | 0.06 | 0.004 | Tr | 0.09 | 0.05 |
| 2 | COMPARATIVE EXAMPLE | AL PLATED | 0.001 | 0.01 | 0.13 | 0.01 | 0.01 | 0.002 | Tr | 0.05 | 0.1 |
| 3 | COMPARATIVE EXAMPLE | CR | 0.03 | 0.01 | 0.15 | 0.01 | 0.02 | 0.001 | Tr | — | 0.03 |
| 4 | COMPARATIVE EXAMPLE | GI | 0.03 | 0.01 | 0.15 | 0.01 | 0.02 | 0.001 | Tr | — | 0.01 |
| 5 | COMPARATIVE EXAMPLE | GL | 0.03 | 0.01 | 0.15 | 0.01 | 0.02 | 0.001 | Tr | — | 0.02 |
| 6 | COMPARATIVE EXAMPLE | AL PLATED | 0.08 | 0.4 | 2.1 | 0.01 | 0.01 | 0.004 | Tr | — | 0.05 |
| 7 | COMPARATIVE EXAMPLE | AL PLATED | 0.001 | 0.01 | 0.8 | 0.01 | 0.01 | 0.002 | Tr | — | 0.008 |
| 8 | EXAMPLE | AL PLATED | 0.005 | 0.3 | 1.3 | 0.01 | 0.01 | 0.005 | Tr | 0.08 | 0.1 |
| 9 | EXAMPLE | AL PLATED | 0.004 | 0.5 | 1.4 | 0.01 | 0.06 | 0.004 | Tr | 0.09 | 0.07 |
| 10 | COMPARATIVE EXAMPLE | AL PLATED | 0.004 | 0.6 | 1.4 | 0.01 | 0.06 | 0.004 | Tr | 0.08 | 0.08 |
| 11 | EXAMPLE | AL PLATED | 0.005 | 0.3 | 1.05 | 0.01 | 0.06 | 0.005 | Tr | 0.09 | 0.03 |
| 12 | EXAMPLE | AL PLATED | 0.005 | 0.3 | 2 | 0.01 | 0.06 | 0.005 | Tr | 0.08 | 0.005 |
| 13 | EXAMPLE | AL PLATED | 0.003 | 0.2 | 1.4 | 0.02 | 0.06 | 0.005 | Tr | 0.08 | 0.03 |
| 14 | COMPARATIVE EXAMPLE | AL PLATED | 0.003 | 0.2 | 1.6 | 0.03 | 0.06 | 0.005 | Tr | 0.08 | 0.03 |
| 15 | EXAMPLE | AL PLATED | 0.002 | 0.1 | 1.8 | 0.01 | 0.08 | 0.005 | Tr | — | 0.04 |
| 16 | COMPARATIVE EXAMPLE | AL PLATED | 0.002 | 0.1 | 1.8 | 0.02 | 0.12 | 0.005 | Tr | — | 0.1 |
| 17 | COMPARATIVE EXAMPLE | AL PLATED | — | — | — | — | — | >0.007 | — | — | 0.1 |

An evaluation as to mechanical characteristics at ordinary temperature, mechanical characteristics after being heated, corrosion resistance, discoloration resistance, weldability, and processability of each sample shown in Table 1 produced in the above was performed. The evaluation results are shown in Table 2. It should be noted that, in Tables 2 and 4, the unit of PS and TS is MPa and the unit of El is %.

TABLE 2

| No | OBJECT | MECHANICAL CHARACTERISTIC VALUE (ORDINARY TEMPERATURE) | | | MECHANICAL CHARACTERISTIC VALUE (AFTER HEATING) | | |
|---|---|---|---|---|---|---|---|
| | | PS | TS | EL | PS | TS | EL |
| 1 | EXAMPLE | 330 | 448 | 34 | 320 | 445 | 34 |
| 2 | COMPARATIVE EXAMPLE | 190 | 305 | 46 | — | — | — |
| 3 | COMPARATIVE EXAMPLE | 214 | 325 | 44 | — | — | — |
| 4 | COMPARATIVE EXAMPLE | 235 | 344 | 40 | — | — | — |
| 5 | COMPARATIVE EXAMPLE | 237 | 345 | 39 | — | — | — |
| 6 | COMPARATIVE EXAMPLE | 427 | 586 | 28 | 556 | 646 | 19 |
| 7 | COMPARATIVE EXAMPLE | 190 | 380 | 47 | — | — | — |
| 8 | EXAMPLE | 336 | 449 | 33 | 328 | 448 | 32 |
| 9 | EXAMPLE | 342 | 465 | 31 | 337 | 463 | 31 |
| 10 | COMPARATIVE EXAMPLE | — | — | — | — | — | — |
| 11 | EXAMPLE | 321 | 441 | 35 | 327 | 442 | 34 |
| 12 | EXAMPLE | 358 | 481 | 31 | 355 | 492 | 30 |
| 13 | EXAMPLE | 332 | 448 | 34 | 480 | 447 | 33 |
| 14 | COMPARATIVE EXAMPLE | 341 | 456 | 33 | 337 | 453 | 33 |
| 15 | EXAMPLE | 346 | 458 | 31 | 344 | 456 | 31 |
| 16 | COMPARATIVE EXAMPLE | 349 | 460 | 31 | 238 | 453 | 30 |
| 17 | COMPARATIVE EXAMPLE | IT WAS NOT PRODUCED DUE TO TOO MUCH COST (OF N ALLOY ADDITION) | | | — | — | — |

TABLE 2-continued

| | CORROSION RESISTANCE | | EVALUATION OF DISCOLORATION RESISTANCE | | | | WELDABILITY PEELING TEST | PROCESSABILITY OT BENDING TEST |
|---|---|---|---|---|---|---|---|---|
| No | RED RUST | WHITE RUST | 500° C. | 550° C. | 600° C. | 650° C. | | |
| 1 | 0% | 2% | ○ | ○ | ○ | ○ | ○ | ○ |
| 2 | 0% | 3% | ○ | □ | Δ | X | ○ | Δ |
| 3 | 100% | — | — | — | — | — | ○ | Δ |
| 4 | 20% | 50% | X | X | X | X | ○ | Δ |
| 5 | 1% | 30% | ○ | □ | Δ | X | X | Δ |
| 6 | 0% | 0.4% | ○ | ○ | ○ | ○ | ○ | X |
| 7 | 0% | 2% | ○ | □ | Δ | X | ○ | ○ |
| 8 | 0% | 2% | ○ | ○ | ○ | ○ | ○ | ○ |
| 9 | 0% | 2% | ○ | ○ | ○ | ○ | ○ | ○ |
| 10 | NON-PLATED SPOT | | — | — | — | — | — | — |
| 11 | 0% | 2% | ○ | ○ | ○ | ○ | ○ | ○ |
| 12 | 0% | 2% | ○ | ○ | ○ | ○ | ○ | ○ |
| 13 | 0% | 2% | ○ | ○ | ○ | ○ | ○ | ○ |
| 14 | 0% | 2% | ○ | ○ | ○ | ○ | ○ | ○ |
| 15 | 0% | 2% | ○ | ○ | ○ | ○ | ○ | ○ |
| 16 | 0% | 2% | ○ | ○ | ○ | ○ | X | ○ |
| 17 | — | — | — | — | — | — | — | — |

Regarding the exemplary mechanical characteristics, both a tension test at ordinary temperature and a tension test in the case of heating samples (excepting sample Nos. 2 to 6, 10, and 17) at 550° C. for 30 seconds were performed on each samples, and 0.2% proof stress PS (MPa), tension strength TS (MPa), and elongation (%) were measured. According to the metal material tension test of JISZ2241, test pieces according to JIS No. 5 were prepared for each sample, and the tension test was performed making the direction of drawing as the width direction (C). Moreover, regarding the corrosion resistance, a salt spray test (SST) was performed on each sample (except sample Nos. 10 and 17), and the resultant red rust incidence rate and white rust incidence rate after 72 hours were measured. Concerning the discoloration resistance, each sample (excepting sample Nos. 3, 10 and 17) was heated in a lab heating furnace (furnace temperature of 700° C.), and was evaluated from the appearance thereof when the temperature of the sheet (heating time) reached 500° C. (250 sec.), 550° C. (280 sec.), 600° C. (360 sec.), and 650° C. (450 sec.). It should be noted that, among the evaluation of discoloration resistance in Table 2, "○" indicates no discoloration, "□" indicates that 10% or less of the surface area generated gray discoloration, "□" indicates that 50% or less of the surface area generated grayish black discoloration, and "x" indicates that over 50% of the surface area generated black discoloration. Moreover, as to weldability, a peeling test was performed on each sample (excepting sample Nos. 10 and 17). It should be noted that in the peeling test, a pair of test pieces with a size of 30 mm×150 mm were prepared for each sample, and after these test pieces were subjected to a spot welding (nugget diameter of 5 mm), each test piece was peeled with a vise and pliers and the fracture situation in the nugget portion was observed by viewing.

Among the peeling test evaluation in Table 2, "○" indicates fracture outside the nugget, and "x" indicates fracture inside the nugget. Moreover, regarding the processability, a 0T bending test (i.e. a test of bending a board-like test piece until the bending angle thereof becomes 180°) was performed on each sample (except sample Nos. 10 and 17). In this bending test, a test piece having a size of 30 mm×150 mm was prepared for each sample, and the resultant test piece was bent without inserting another test piece there between by a bending tester, and thereafter the presence or absence of cracking at the bent portion thereof was observed by viewing. Among the 0T bending test evaluation, "○" indicates no cracks or minute cracks (⅕ or less of the length of the test piece), "□" indicates small cracks (½ or less of the length of the test piece), and "x" indicates large cracks, breaking, or nearly breaking.

As provided in Table 2, sample Nos. 3 to 6 which had a C content exceeding 0.005% were liable to show aging, and cracks were observed in the 0T bending test. Moreover, in sample Nos. 2 to 5 and 7, of which the Mn content was less than 1.05%, TS thereof became not less than 400 MPa (TS≧400 MPa) and hardness thereof was insufficient. Moreover, in sample No. 7, of which the Mn content exceed 2.0%, TS thereof became not less than 600 MPa (TS≧600 MPa), and hardness thereof was too high, thereby deteriorating processability. Furthermore, alloying cost also becomes high. Moreover, in sample No. 10, of which the Si content exceeded 0.5%, wettability thereof deteriorated to cause no plating. Moreover, in sample No. 14, of which S content exceeded 0.02%, fracture inside the peeling was generated in the peeling test, and the strength reduction of a welded portion was observed. Moreover, in sample No. 16, of which the P content exceeds 0.1%, fracture inside the peeling was generated in the peeling test, and the strength reduction of a welded portion was observed. It should be noted that in sample No. 17, of which the N content exceeded 0.005%, was not prepared because the production cost thereof is high. Accordingly, values of components such as C, Si, Mn, etc. are not described.

From the results in the above, it was revealed that the first aluminum type plated steel sheet of the present invention excels in discoloration resistance, weldability, and processability, because the first aluminum type plated steel sheet of the present invention is capable of preventing deterioration in strength of the welded part, without causing discoloration even after being re-heated.

Further, as Examples and Comparative Examples of the second aluminum type plated steel sheet, each steel sheet of which the steel component differ from each other as shown in Table 3 was cast, re-heated, and thereafter hot-rolled, pickled, cold-rolled, and annealed to obtain each steel plate. And each steel sheet was subjected to a hot-dip plating using a hot-dip plating line of a Non Oxygen Furnace (NOF)-Reduction Furnace (RF) type (NOF sheet temperature ≧600° C., RF sheet temperature ≧800° C.), while changing the kind of aluminum plating bath (Si concentration ranges from 9% to 11%, plating bath temperature ranges from 640° C. to 670° C.). The dew point in the reduction furnace was adjusted to be within the range of 0° C. to −40° C. And skin pass rolling was performed to produce each of samples 1 to 18 having a thickness of 1.7 mm finally. It should be noted that, in Table 3, CR in sample No. 3 indicates a cold-rolled material, GI in sample No. 4 indicates a hot dip galvanizing, and GL in sample No. 5 indicates Galbarium (aluminum 55%-Zn).

TABLE 3

| No | OBJECT | KIND | STEEL COMPONENT (%) | | | | | | | |
|---|---|---|---|---|---|---|---|---|---|---|
| | | | C | Si | Mn | S | P | N | Nb | Al |
| 1 | EXAMPLE | AL PLATED | 0.15 | 0.15 | 1.4 | 0.01 | 0.01 | 0.004 | 0.05 | 0.03 |
| 2 | COMPARATIVE EXAMPLE | AL PLATED | 0.001 | 0.01 | 0.13 | 0.01 | 0.01 | 0.002 | 0.05 | 0.05 |
| 3 | COMPARATIVE EXAMPLE | CR | 0.03 | 0.01 | 0.15 | 0.01 | 0.02 | 0.001 | 0.05 | 0.08 |
| 4 | COMPARATIVE EXAMPLE | GI | 0.03 | 0.01 | 0.15 | 0.01 | 0.02 | 0.001 | 0.05 | 0.04 |
| 5 | COMPARATIVE EXAMPLE | GL | 0.03 | 0.01 | 0.15 | 0.01 | 0.02 | 0.001 | 0.05 | 0.01 |
| 6 | COMPARATIVE EXAMPLE | AL PLATED | 0.08 | 0.4 | 2.1 | 0.01 | 0.01 | 0.004 | 0.05 | 0.04 |
| 7 | COMPARATIVE EXAMPLE | AL PLATED | 0.001 | 0.01 | 0.8 | 0.01 | 0.01 | 0.005 | 0.05 | 0.03 |
| 8 | EXAMPLE | AL PLATED | 0.15 | 0.5 | 1.4 | 0.01 | 0.06 | 0.004 | 0.04 | 0.005 |
| 9 | COMPARATIVE EXAMPLE | AL PLATED | 0.15 | 0.6 | 1.4 | 0.01 | 0.06 | 0.005 | 0.04 | 0.03 |
| 10 | EXAMPLE | AL PLATED | 0.07 | 0.3 | 1.05 | 0.01 | 0.02 | 0.005 | 0.04 | 0.1 |
| 11 | EXAMPLE | AL PLATED | 0.15 | 0.3 | 2 | 0.01 | 0.06 | 0.005 | 0.04 | 0.03 |
| 12 | EXAMPLE | AL PLATED | 0.08 | 0.2 | 1.3 | 0.02 | 0.02 | 0.005 | 0.04 | 0.04 |
| 13 | COMPARATIVE EXAMPLE | AL PLATED | 0.18 | 0.2 | 1.6 | 0.03 | 0.04 | 0.004 | 0.04 | 0.03 |
| 14 | EXAMPLE | AL PLATED | 0.10 | 0.1 | 1.8 | 0.01 | 0.1 | 0.003 | 0.04 | 0.08 |
| 15 | COMPARATIVE EXAMPLE | AL PLATED | 0.15 | 0.1 | 1.8 | 0.01 | 0.12 | 0.004 | 0.04 | 0.02 |
| 16 | EXAMPLE | AL PLATED | 0.09 | 0.1 | 1.8 | 0.01 | 0.06 | >0.007 | 0.04 | 0.01 |
| 17 | COMPARATIVE EXAMPLE | AL PLATED | 0.15 | 0.3 | 1.4 | 0.01 | 0.06 | 0.004 | 0.005 | 0.02 |
| 18 | COMPARATIVE EXAMPLE | AL PLATED | 0.25 | 0.1 | 1.4 | 0.01 | 0.01 | 0.004 | 0.04 | 0.01 |

An evaluation as to mechanical characteristics at ordinary temperature, mechanical characteristics after being heated, corrosion resistance, discoloration resistance, weldability, and processability of each sample shown in Table 3 produced in the above was performed. The evaluation results are shown in Table 4. It should be noted that the units in Table 4 are the same as in that in Table 2.

TABLE 4

| No | OBJECT | MECHANICAL CHARACTERISTIC VALUE (ORDINARY TEMPERATURE) | | | MECHANICAL CHARACTERISTIC VALUE (AFTER HEATING) | | |
|---|---|---|---|---|---|---|---|
| | | YP | TS | EL | YP | TS | EL |
| 1 | EXAMPLE | 548 | 638 | 26 | 559 | 636 | 22 |
| 2 | COMPARATIVE EXAMPLE | 195 | 323 | 45 | — | — | — |
| 3 | COMPARATIVE EXAMPLE | 223 | 327 | 43 | — | — | — |
| 4 | COMPARATIVE EXAMPLE | 243 | 348 | 39 | — | — | — |
| 5 | COMPARATIVE EXAMPLE | 241 | 346 | 39 | — | — | — |
| 6 | COMPARATIVE EXAMPLE | IT WAS NOT PRODUCED DUE TO TOO MUCH COST (OF Mn ALLOY ADDITION) | | | — | — | — |
| 7 | COMPARATIVE EXAMPLE | 190 | 380 | 41 | — | — | — |
| 8 | EXAMPLE | 585 | 679 | 21 | 599 | 658 | 16 |
| 9 | COMPARATIVE EXAMPLE | — | — | — | — | — | — |
| 10 | EXAMPLE | 502 | 591 | 26 | 518 | 598 | 23 |
| 11 | EXAMPLE | 588 | 673 | 22 | 592 | 863 | 18 |
| 12 | EXAMPLE | 526 | 632 | 21 | 555 | 621 | 19 |
| 13 | COMPARATIVE EXAMPLE | 557 | 642 | 25 | 577 | 640 | 20 |
| 14 | EXAMPLE | 593 | 675 | 20 | 698 | 666 | 16 |
| 15 | COMPARATIVE EXAMPLE | 596 | 698 | 19 | 604 | 695 | 15 |
| 16 | EXAMPLE | 554 | 662 | 23 | 560 | 660 | 19 |
| 17 | COMPARATIVE EXAMPLE | 387 | 536 | 33 | — | — | — |
| 18 | COMPARATIVE EXAMPLE | 579 | 697 | 20 | 581 | 675 | 19 |

| No | CORROSION RESISTANCE | | EVALUATION OF DISCOLORATION RESISTANCE | | | | WELDABILITY PEELING TEST |
|---|---|---|---|---|---|---|---|
| | RED RUST | WHITE RUST | 500° C. | 550° C. | 600° C. | 650° C. | |
| 1 | 0% | 2% | ○ | ○ | ○ | ○ | ○ |
| 2 | 0% | 3% | ○ | □ | Δ | X | ○ |
| 3 | 100% | — | — | — | — | — | ○ |
| 4 | 20% | 50% | X | X | X | X | ○ |

TABLE 4-continued

| | | | | | | | | |
|---|---|---|---|---|---|---|---|---|
| 5 | 1% | 30% | ○ | □ | △ | X | ○ | |
| 6 | — | — | — | — | — | — | ○ | |
| 7 | 0% | 2% | ○ | □ | △ | X | ○ | |
| 8 | 0% | 2% | ○ | ○ | ○ | ○ | ○ | |
| 9 | NON-PLATED SPOT | | — | — | — | — | — | |
| 10 | 0% | 3% | ○ | ○ | ○ | ○ | ○ | |
| 11 | 0% | 2% | ○ | ○ | ○ | ○ | ○ | |
| 12 | 0% | 2% | ○ | ○ | ○ | ○ | ○ | |
| 13 | 0% | 3% | ○ | ○ | ○ | ○ | X | |
| 14 | 0% | 3% | ○ | ○ | ○ | ○ | ○ | |
| 15 | 0% | 3% | ○ | ○ | ○ | ○ | X | |
| 16 | 0% | 3% | ○ | ○ | ○ | ○ | — | |
| 17 | INSUFFICIENT STRENGTH | | — | — | — | — | — | |
| 18 | 0% | 3% | ○ | ○ | ○ | ○ | X | |

Regarding the mechanical characteristics, both a tension test at ordinary temperature and a tension test in the case of heating samples (except sample Nos. 2 to 7, 9, and 10) at 550° C. for 30 seconds were performed on each sample, and yield point thereof YP (MPa), tension strength TS (MPa), and elongation (%) were measured. It should be noted that according to the metal material tension test of JISZ2241, test pieces according to JIS No. 5 were prepared for each sample, and the tension test was performed making the direction of drawing as width direction (C). Moreover, as to corrosion resistance, a salt spray test (SST) was performed on each sample (excepting sample Nos. 9 and 17), and the resultant red rust incidence rate and white rust incidence rate after 72 hours were measured. Concerning the discoloration resistance, each sample (excepting sample Nos. 3, 9 and 17) was heated in a lab heating furnace (furnace temperature of 700° C.), and was evaluated from the appearance thereof when the temperature of the sheet (heating time) reached 500° C. (250 sec.), 550° C. (280 sec.), 600° C. (360 sec.), and 650° C. (450 sec.).

Among the evaluation of discoloration resistance in Table 4, "○" indicates no discoloration, "□" indicates that 10% or less of the surface area generated gray discoloration, "▪" indicates that 50% or less of the surface area generated grayish black discoloration, and "x" indicates that over 50% of the surface area generated black discoloration. Moreover, as to weldability, a peeling test was performed on each sample (except sample Nos. 9, 16 and 17). In the peeling test, a pair of test pieces with a size of 30 mm×150 mm were prepared for each sample, and after these test pieces were subjected to a spot welding (nugget diameter of 5 mm), each test piece was peeled with a vise and pliers and the fracture situation in the nugget portion was observed by viewing. Among the peeling test evaluation in Table 4, "○" indicates fracture outside the nugget, and "x" indicates fracture inside the nugget.

As is clear from Table 4, in sample No. 19, which has a C content exceeding 0.2%, it was difficult to determine the condition desirable for welding, fracture inside the nugget was generated, and deterioration in strength of the welded portion was observed. Moreover, in sample Nos. 2 to 5 and 7, each of which the Mn content is less than 1.05%, TS thereof became not less than 550 MPa (TS≧550 MPa) and hardness thereof was insufficient. Further, sample No. 6, of which the Mn content exceeded 2.0%, was not prepared because production cost thereof is high. Moreover, in sample No. 9, of which the Si content exceeded 0.5%, wettability thereof deteriorated to cause no plating. Additionally, in sample No. 13, of which the S content exceeded 0.02%, the fracture inside the peeling was generated in the peeling test, and the strength reduction of a welded portion was observed. Moreover, in sample No. 15, of which the P content exceeded 0.1%, the fracture inside the peeling was generated in the peeling test, and the strength reduction of a welded portion was observed.

In addition, sample No. 16, of which the N content exceeds 0.007%, was not prepared because production cost thereof is high. Moreover, in sample No. 17, of which the Nb content is less than 0.01%, it was insufficient in effect for reinforcing the deposition of NbC and had insufficient strength.

From the results in the above, it was determined that, e.g., the second aluminum type plated steel sheet of the present invention excels in discoloration resistance, weldability, and processability, because the first aluminum type plated steel sheet according to the exemplary embodiment of the present invention is capable of preventing deterioration in strength of the welded part, without causing discoloration even after being re-heated.

The exemplary embodiment of the aluminum type plated steel sheet according to the present invention may be applied is not limited to application to the heat shrink band mentioned above, but can also be applied to those which require heat-resistance and corrosion resistance such as an exhaust pipe of an automobile, a home heating instrument, a fuel cell panel, etc.

The foregoing merely illustrates the exemplary principles of the present invention. Various modifications and alterations to the described embodiments will be apparent to those skilled in the art in view of the teachings herein. It will thus be appreciated that those skilled in the art will be able to devise numerous modification to the exemplary embodiments of the present invention which, although not explicitly shown or described herein, embody the principles of the invention and are thus within the spirit and scope of the invention. All publications, applications and patents cited above are incorporated herein by reference in their entireties.

The invention claimed is:

1. A melting aluminum and silicon plated steel sheet, comprising:
    a steel sheet portion which comprises at most about 0.005 mass % of C, at most about 0.005 mass % of N, at least about 0.1 mass % and at most about 0.5 mass % of Si, at most about 0.1 mass % of P, at most about 0.02 mass % of S, at least about 1.05 mass % and at most about 1.3 mass % of Mn, at most about 1.0 mass % of sol Al, a residual amount of Fe and inevitable impurities; and
    an aluminum and silicon plated layer comprising Al and Si being deposited on the steel sheet portion so as to reduce or prevent a discoloration when the aluminum and silicon plated layer is re-heated at a temperature of at least about 500° C. to at most about 700° C., the aluminum and silicon plated layer having more than approximately 6 mass % Si and less than approximately 12 mass % Si.

2. The aluminum and silicon plated steel sheet according to claim 1, wherein, when an amount of C in the steel sheet portion is at most about 0.003 mass %, an amount of N is at most about 0.004 mass %, an amount of P is at least about 0.05 mass % and at most about 0.08 mass %, and an amount of Mn is at least about 1.05 mass % and at most about 1.3 mass %, about 0.2 mass % proof stress PS is at least about 300 MPa and a tensile strength TS is at least about 400 MPa.

3. The melting aluminum and silicon plated steel sheet of claim 1, wherein the steel sheet portion includes at least about 0.1 mass % Si and at most about 0.3 mass % Si, and at least about 0.1 mass % sol Al and at most about 1.0 mass % sol Al.

4. A melting aluminum and silicon plated steel sheet, comprising:
   a steel sheet portion comprising at most about 0.005 mass % of C, at most about 0.005 mass % of N, at least about 0.1 mass % and at most about 0.5 mass % of Si, at most about 0.1 mass % of P, at most about 0.02 mass % of S; at least about 1.05 mass % and not more than 1.3 mass % of Mn, at most about 1.0 mass % of sol Al; a residual amount of Fe and inevitable impurities; and
   an aluminum and silicon plated layer comprising Al and Si being deposited on the steel sheet portion so as to effectuate a reduction in strength upon being heated at a temperature of at least about 500° C. to at most about 700° C. after being plated at most about 10% compared to being plated before being at least one of heated or re-heated, the aluminum and silicon plated layer having more than approximately 6 mass % Si and less than approximately 12 mass % Si.

5. The aluminum and silicon plated steel sheet according to claim 4, wherein, when an amount of C is not more than 0.003 mass %, an amount of N is at most about 0.004 mass %, an amount of P is at least about 0.05 mass % and at most about 0.08 mass %, and an amount of Mn is at least about 1.05 mass % and at most about 1.3 mass %, about 0.2 mass % proof stress PS is at least about 300 MPa and a tensile strength TS is at least about 400 MPa.

6. The melting aluminum and silicon plated steel sheet of claim 4, wherein the steel sheet portion includes at least about 0.1 mass % Si and at most about 0.3 mass % Si, and at least about 0.1 mass % sol Al and at most about 1.0 mass % sol Al.

7. A heat shrink band which is configured to utilize a melting aluminum and silicon plated steel sheet, comprising:
   a steel sheet portion being composed of at most about 0.005 mass % of C, at most about 0.005 mass % of N, at least about 0.1 mass % and at most about 0.5 mass % of Si, at most about 0.1 mass % of P, at most about 0.02 mass % of S; at least about 1.05 mass % and at most about 1.3 mass % of Mn, at most about 1.0 mass % of sol Al, a residual amount of Fe and inevitable impurities; and
   an aluminum and silicon plated layer comprising Al and Si being deposited on the steel sheet portion, the aluminum and silicon plated layer having more than approximately 6 mass % Si and less than approximately 12 mass % Si.

8. The heat shrink band according to claim 7, wherein, in the melting aluminum and silicon plated steel sheet, when an amount of C is at most about 0.003 mass %, an amount of N is at most about 0.004 mass %, an amount of P is at least about 0.05 mass % and at most about 0.08 mass %, and an amount of Mn is at least about 1.05 mass % and at most about 1.3 mass %, about 0.2 mass % proof stress PS is at least about 300 MPa and a tensile strength TS is at least about 400 Mpa.

9. The heat shrink band of claim 7, wherein the steel sheet portion includes at least about 0.1 mass % Si and at most about 0.3 mass % Si, and at least about 0.1 mass % sol Al and at most about 1.0 mass % sol Al.

* * * * *